(12) United States Patent
Contaldi et al.

(10) Patent No.: US 11,703,043 B2
(45) Date of Patent: Jul. 18, 2023

(54) OIL SEPARATOR FOR A COMPRESSOR AND COMPRESSOR ASSEMBLY COMPRISING SAID SEPARATOR

(71) Applicant: ING. ENEA MATTEI S.P.A., Vimodrone (IT)

(72) Inventors: Giulio Contaldi, Segrate (IT); Stefano Murgia, Vimodrone (IT)

(73) Assignee: ING. ENEA MATTEI S.P.A., Vimodrone (IT)

( * ) Notice: Subject to any disclaimer, the term of this patent is extended or adjusted under 35 U.S.C. 154(b) by 740 days.

(21) Appl. No.: 16/604,053

(22) PCT Filed: Apr. 24, 2018

(86) PCT No.: PCT/IB2018/052861
§ 371 (c)(1),
(2) Date: Oct. 9, 2019

(87) PCT Pub. No.: WO2018/198037
PCT Pub. Date: Nov. 1, 2018

(65) Prior Publication Data
US 2020/0072209 A1    Mar. 5, 2020

(30) Foreign Application Priority Data

Apr. 24, 2017  (IT) .......................... 202017000044768
Jul. 27, 2017  (IT) .......................... 102017000086560

(51) Int. Cl.
*F25B 43/02*    (2006.01)
*B01D 5/00*    (2006.01)
(Continued)

(52) U.S. Cl.
CPC ................ *F04B 39/02* (2013.01); *B01D 5/00* (2013.01); *F04B 39/04* (2013.01);
(Continued)

(58) Field of Classification Search
CPC .. F25B 43/02; F25B 2400/02; F25B 2400/23; B01D 5/00; B01D 35/00; B01D 35/005; B01D 35/02; F04B 39/02; F04B 39/0207
See application file for complete search history.

(56) References Cited

U.S. PATENT DOCUMENTS 4,014,216 A * 3/1977 Thornton ............. G01N 1/2247
73/863.61
11,406,912 B2 * 8/2022 Litt ..................... B01D 5/0009
(Continued)

FOREIGN PATENT DOCUMENTS

CN     101642648 A  *  2/2010
CN     204 402 802       6/2015
(Continued)

OTHER PUBLICATIONS

English translation of CN 101642648 by PE2E Oct. 29, 2022.*

*Primary Examiner* — Deming Wan
(74) *Attorney, Agent, or Firm* — Leason Ellis LLP

(57) ABSTRACT

An oil separator for a compressor comprising a tank and a lid for the tank, which comprises, in an integral manner, a valve body defining an outlet duct of the separator, a head of a coalescence filter, a body of an anti-condensate valve, a body of a minimum pressure valve and the relative connection ducts.

11 Claims, 9 Drawing Sheets

(51) Int. Cl.
  *B01D 35/00* (2006.01)
  *F04B 39/02* (2006.01)
  *F04B 39/04* (2006.01)
  *B01D 46/00* (2022.01)
  *F04B 39/14* (2006.01)
  *F04B 39/16* (2006.01)
  *B01D 21/00* (2006.01)

(52) U.S. Cl.
  CPC ........ *B01D 21/0051* (2013.01); *B01D 46/003* (2013.01); *B01D 46/0089* (2013.01); *F04B 39/14* (2013.01); *F04B 39/16* (2013.01)

(56) References Cited

U.S. PATENT DOCUMENTS

| | | | |
|---|---|---|---|
| 2007/0084785 A1* | 4/2007 | Schuster | B01D 46/46 210/435 |
| 2008/0197060 A1* | 8/2008 | Girondi | F02M 37/28 210/86 |
| 2014/0165977 A1* | 6/2014 | Copley | B01D 50/20 123/573 |

FOREIGN PATENT DOCUMENTS

| | | |
|---|---|---|
| EP | 0 947 232 | 10/1999 |
| JP | 2000 073956 | 3/2000 |
| JP | 2016 215129 | 12/2016 |

* cited by examiner

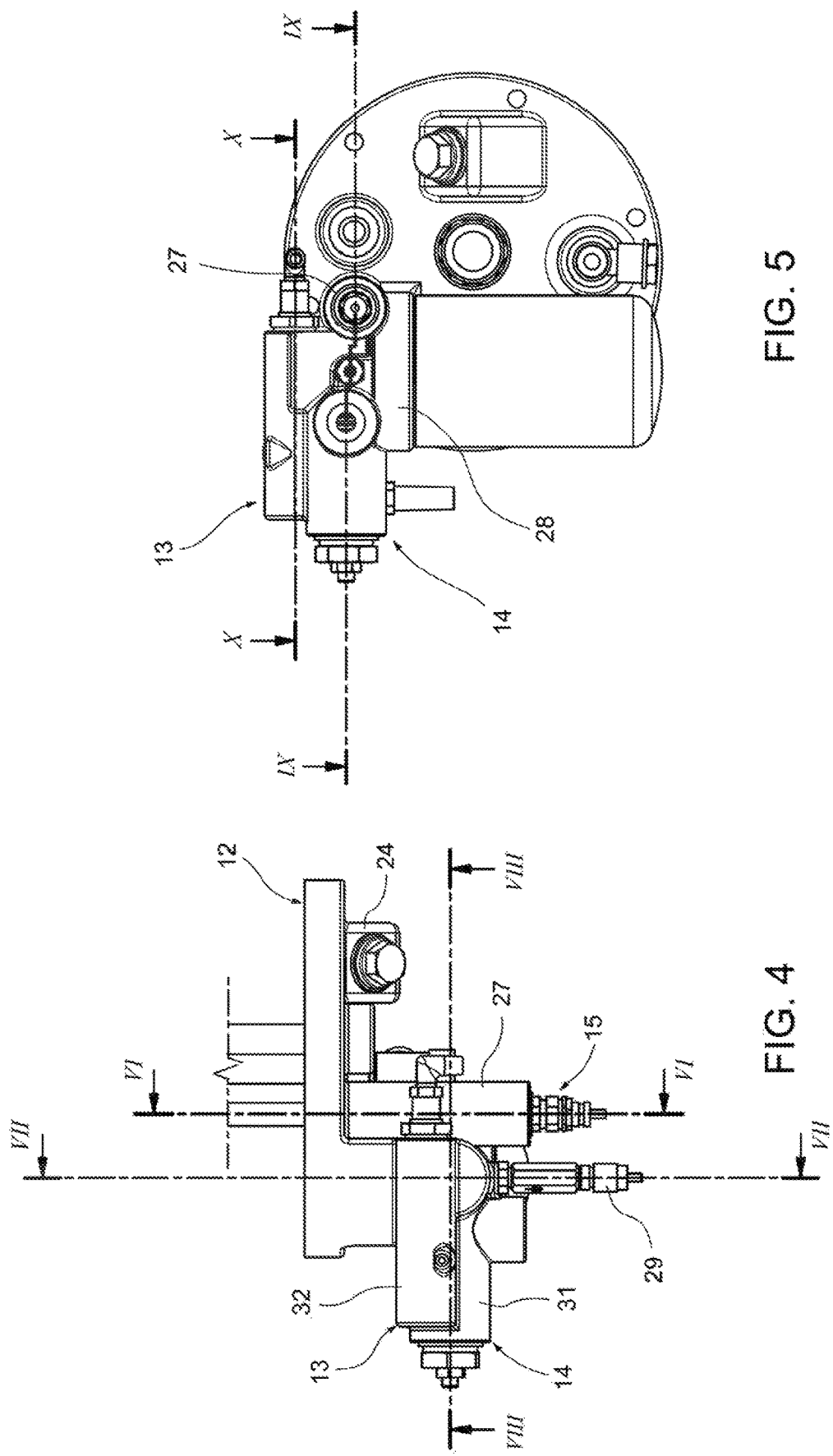

OIL SEPARATOR FOR A COMPRESSOR AND COMPRESSOR ASSEMBLY COMPRISING SAID SEPARATOR

CROSS-REFERENCE TO RELATED PATENT APPLICATIONS

This application is a U.S. National Phase Application under 35 U.S.C. § 371 of International Patent Application No. PCT/IB2018/052861, filed Apr. 24, 2018, which claims priority from Italian Utility Model Application No. 202017000044768 filed on Apr. 24, 2017 and Italian Patent Application No. 102017000086560 filed on Jul. 27, 2017, all of which are incorporated by reference, as if expressly set forth in their respective entireties herein.

TECHNICAL FIELD

The invention relates to an oil separator for a compressor designed for the production of compressed gas and to a compressor assembly comprising said separator. This invention finds preferred (though not exclusive) application in the field of compressors for motor vehicles, in particular trucks, but it can also be used in every industrial field.

BACKGROUND ART

As it is known, compressors are usually associated with auxiliary devices, such a separator to separate the lubricating oil from the compressed air, which also works as an oil tank, an anti-condensate valve, a minimum pressure valve, as well as further accessory elements and ducts for the connection between the aforesaid elements. The reduction of the dimensions and of the weight of the components is a widely spread need, especially in vehicle applications. A further need is that of reducing the number of components and of simplifying the assembling cycles, so as to contain manufacturing costs.

DISCLOSURE OF INVENTION

The object of the invention is to provide an oil separator for a compressor, which is capable of solving the above-mentioned problems.

The aforesaid object is reached by an oil separator according to claim 1.

A further object of the invention is to provide a compact compressor assembly, which can easily be installed on board a vehicle.

The aforesaid object is reached by a compressor assembly according to claim 9.

BRIEF DESCRIPTION OF THE DRAWINGS

The invention will be best understood upon perusal of the following detailed description of a preferred embodiment, which is provided by way of non-limiting example, with reference to the accompanying drawings, wherein:

FIGS. 4 and 5 are a view from the top and a front view, respectively, of a lid of the separator of FIG. 2;

BEST MODE FOR CARRYING OUT THE INVENTION

Figure 1:
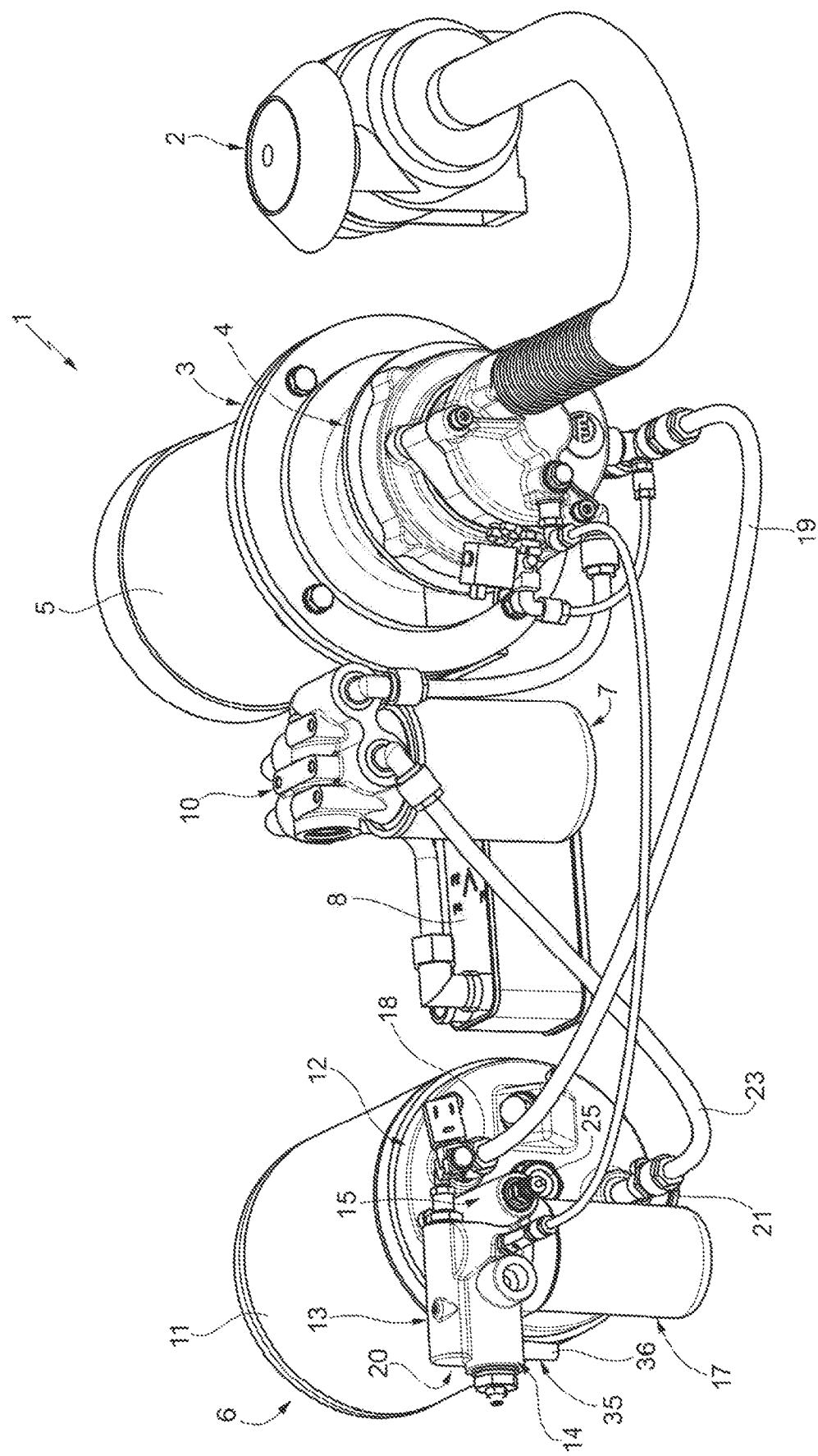
FIG. 1 shows a compressor assembly comprising an oil separator according to the invention.

With reference to FIG. 1, number 1 indicates, as a whole, a compressor assembly comprising the following main components:

an air filter 2, which is designed to filer the ambient air flowing in;

a motor-compressor 3 comprising a blade compressor 4 and an electric motor 5 for driving the compressor 4;

a separator 6, which is connected to an outlet of the compressor 4 and is designed to separate the lubricating oil of the compressor from the compressed air;

an oil filter 7, which is interposed between the separator 6 and the compressor 4; and a heat exchanger 8, which can be connected in series to the oil filter 7 through a thermostatic valve 10 and can be selectively activated from the latter.

The compressor assembly 1 has a modular structure. The above-mentioned five main components (air filter 2, motor-compressor 3, separator 6, oil filter 7, exchanger 8) are manufactured as distinct modules, which can be autonomously placed on board the vehicle and can be connected to one another through flexible ducts. This modular structure allows manufacturers to make better use of the spaces available on board the vehicle and, in particular, does not require a large available space for housing the entire unit.

Figure 2:
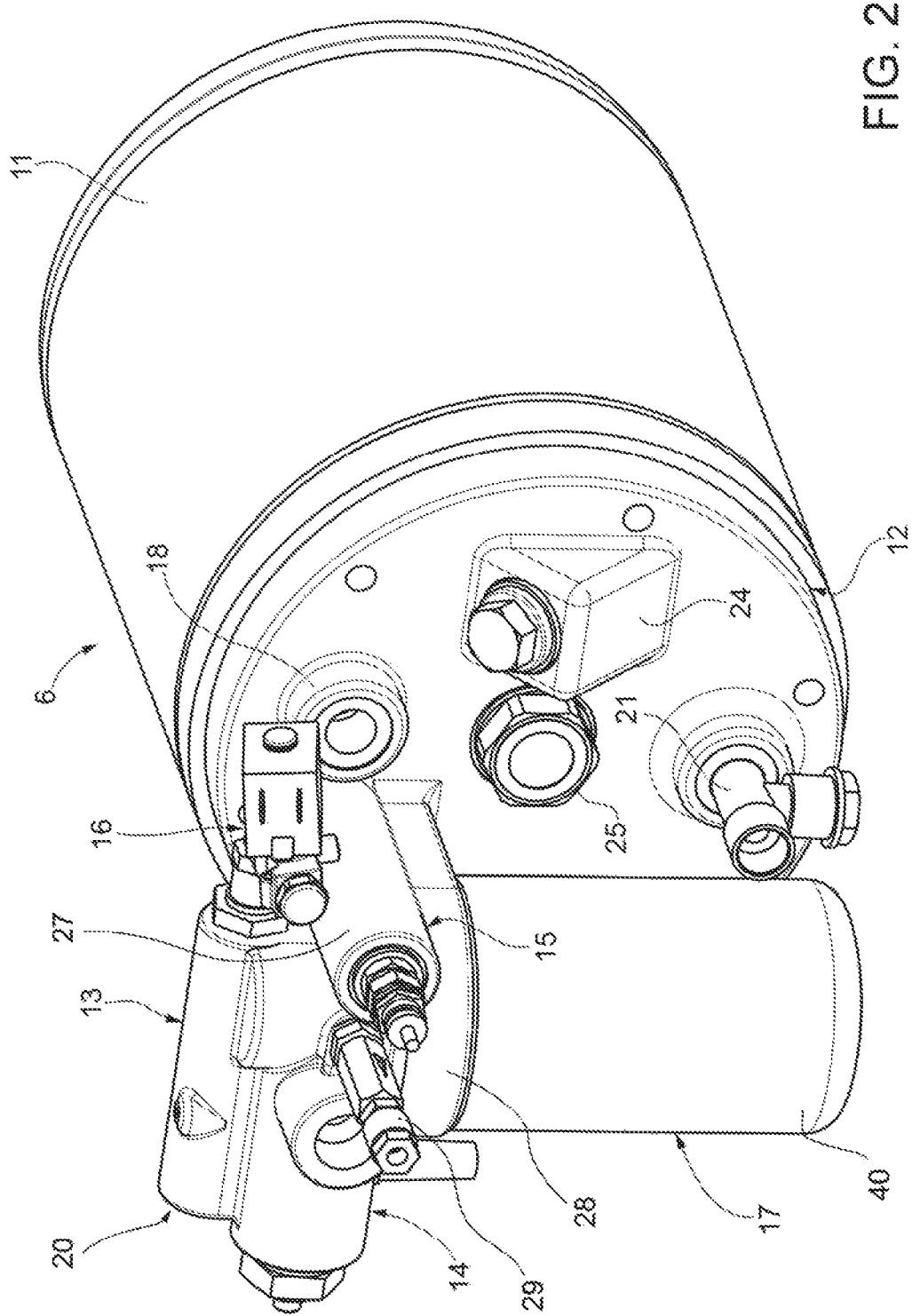
FIG. 2 shows the oil separator of the compressor assembly of FIG. 1.

With reference to FIG. 2, the separator 6 comprises a tank 11, which preferably (though not necessarily) has a cylindrical shape with a horizontal axis, and a lid 12 to close a front opening of the tank 11.

The separator 6 comprises the following auxiliary devices, which are described more in detail below:

an anti-condensate valve 13; this known device fulfils the function of preventing the anomalous formation of condensate inside the compressor 4;

a minimum pressure adjusting valve 14 (minimum pressure valve);

a safety valve 15 (maximum pressure valve);

a venting solenoid valve 16; this device activates upon turning off of the machine and permits the venting of the air contained inside the system, thus determining a reduction of the pressure to which the compressor is subjected. This allows the load conditions to be brought back to optimal levels for a subsequent starting of the machine in complete safety; and a coalescence filter 17.

On the lid 12 there are obtained in an integral manner (FIGS. 1 and 2):

a first union 18 for the connection to the compressor 4 through a first flexible pipe 19; through the first union 18 a mixture of compressed air and oil is introduced into the tank 11;

a valve body 20 with a complex shape, which is designed more in detail below;

a second union 21 for the connection to the oil filter 7 through a second flexible pipe 23;

a first inlet 24 to load oil into the tank 11; and a pressure indicating body 25.

Conveniently, the first union 18 and the second union are arranged in an upper area and in a lower area, respectively, of the lid 12 and, therefore, are in communication with an upper area and a lower area, respectively, of the tank 11.

Figure 3:
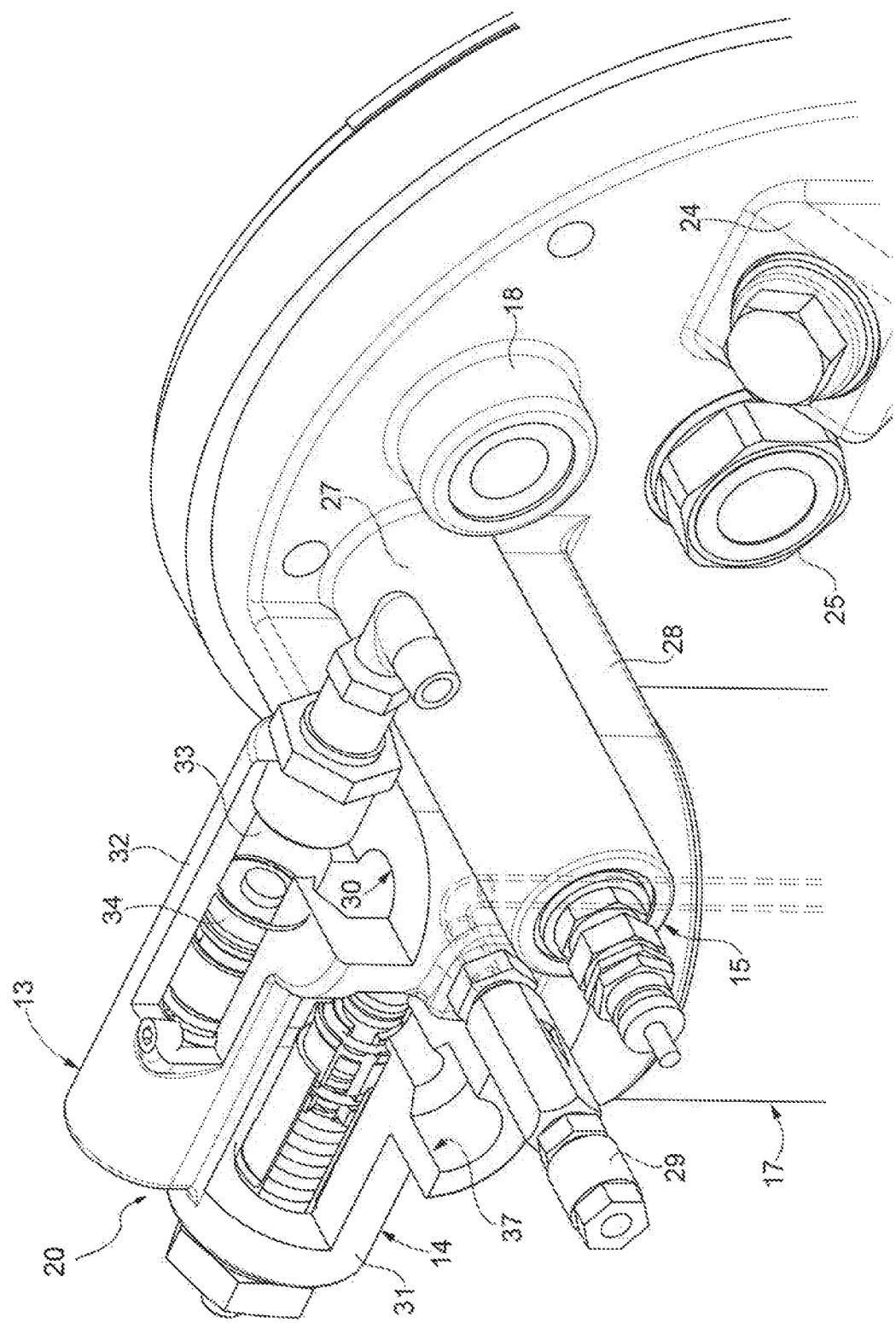
FIG. 3 shows a detail of the separator of FIG. 2, on a larger scale.
Figure 7:
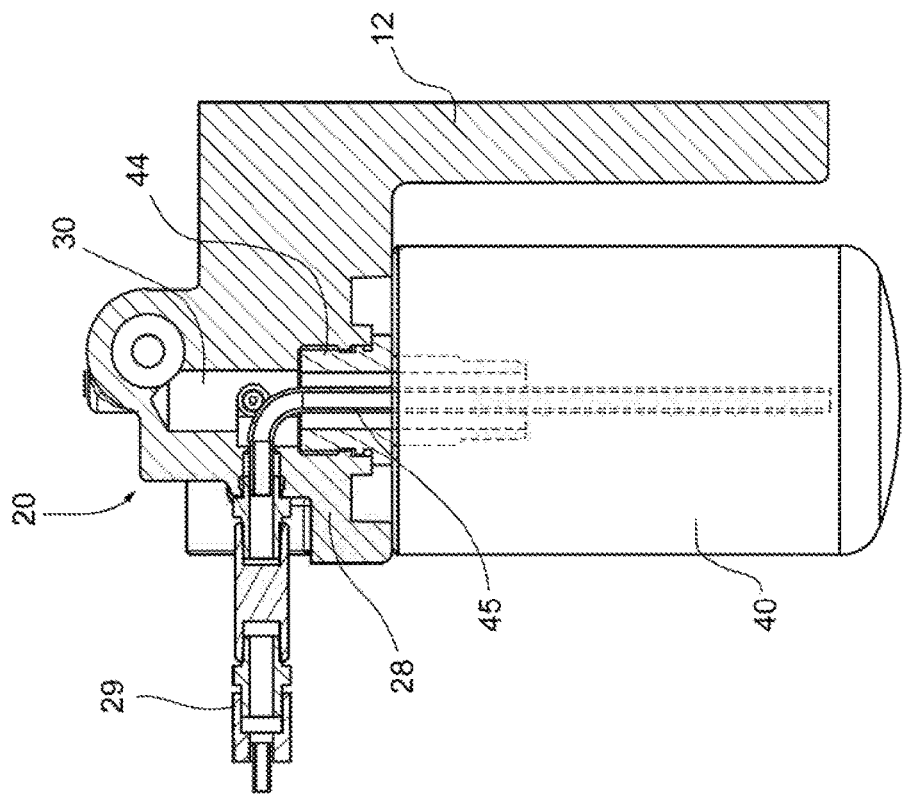
FIGS. 6, 7 and 8 are cross sections along lines VI-VI, VII-VII and VIII-VIII of FIG. 4.
Figure 6:
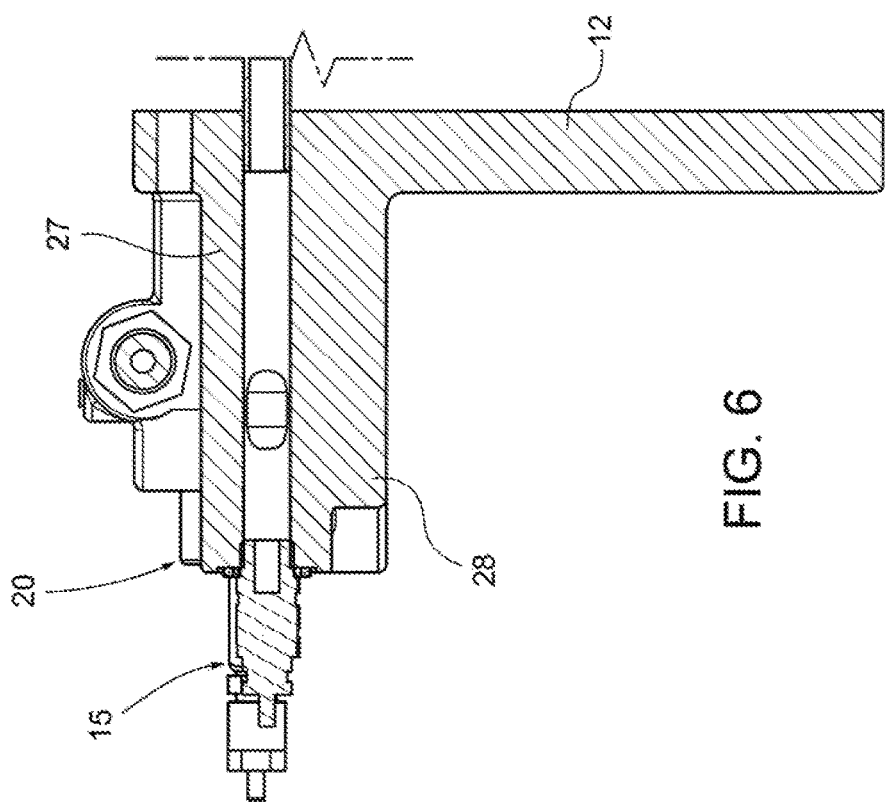
Figure 9:
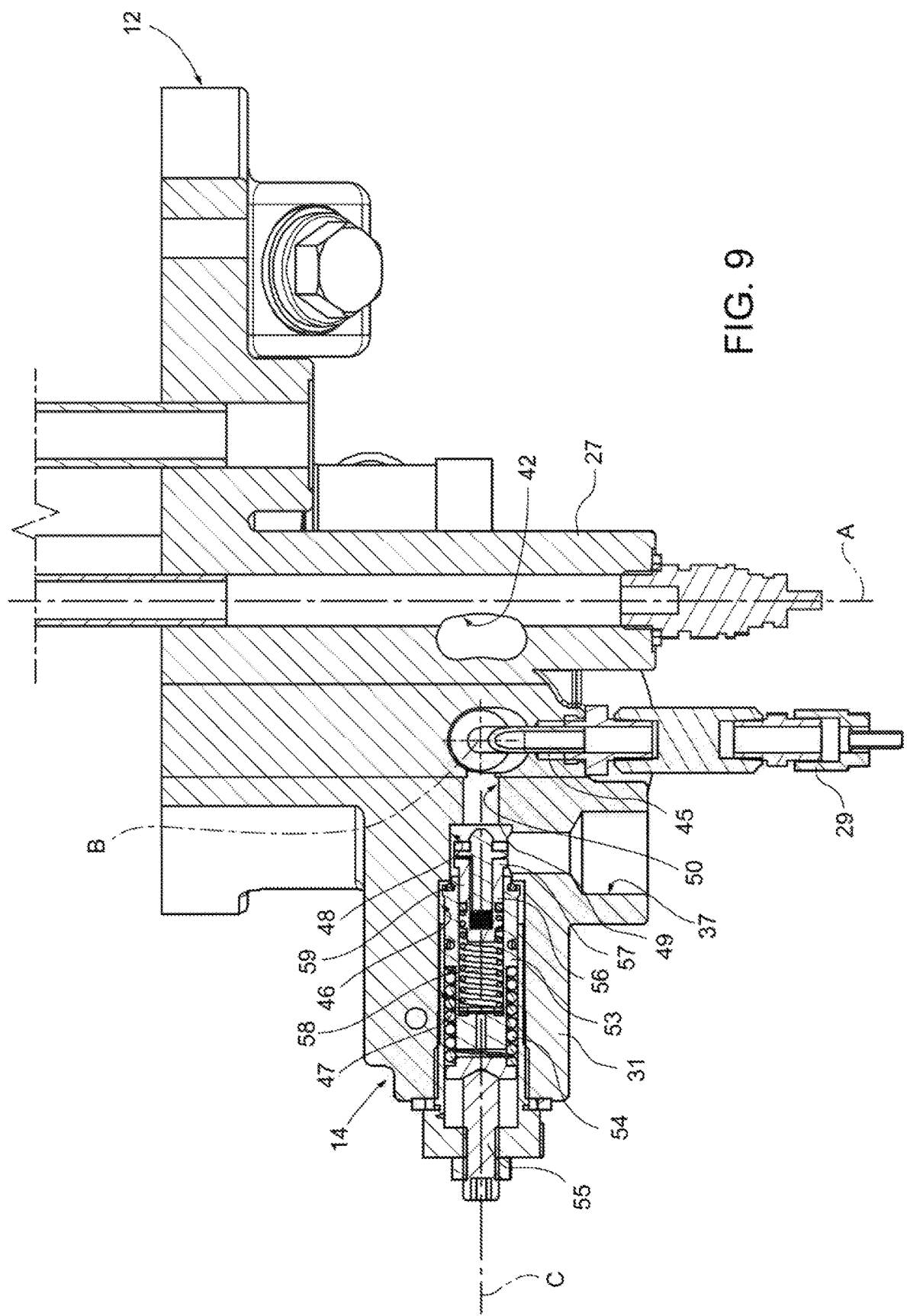
FIGS. 9 and 10 are cross sections along lines IX-IX and X-X of FIG. 5.

The valve body 20 comprises a tubular duct 27 with axis A, which projects from the lid 12 at the front and defines an outlet of the tank 11; in an end area of the tubular duct 27 there is housed the safety valve 15 (FIGS. 3 and 9).

Figure 8:
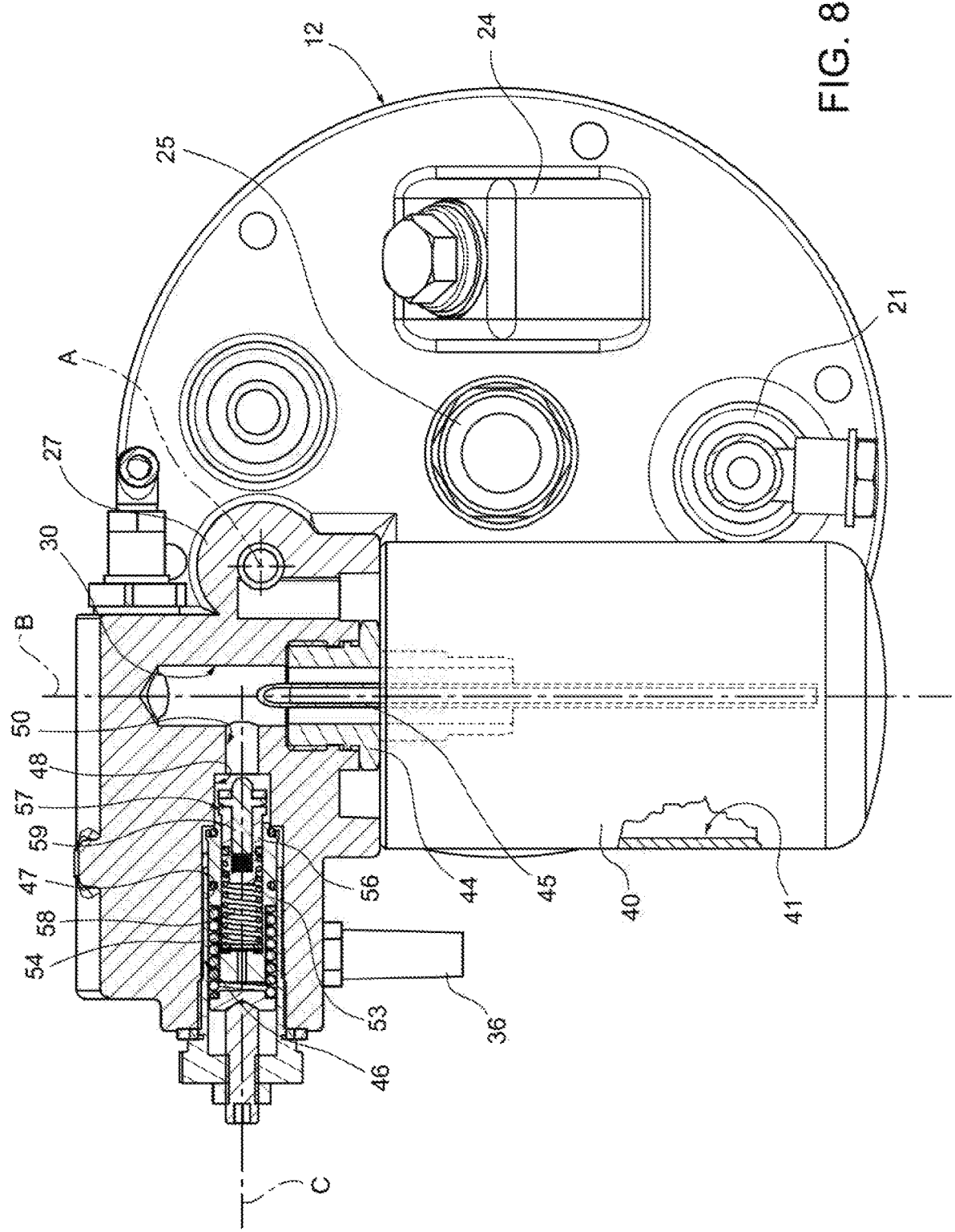

The valve body 20 further defines an upper head 28 of the coalescence filter 17, substantially with the shape of a frontally rounded shelf projecting from the lid 12 at the front. The coalescence filter comprises a hollow cup-shaped body 40 with a substantially cylindrical shape with vertical axis B, which defines, on the inside, a volume 41. This volume 41 communicates with the tubular duct 27 through a vertical passage 42 on the inside of the valve body 20 (FIGS. 8 and 9).

The head 28 has a central hole with axis B, which defines an outlet duct 30 for the air of the coalescence filter 17, where a hollow union 44 is screwed.

The union 44 houses, with a radial clearance, an oil outlet pipe 45, which extends downwards up until it gets close to the bottom of the cup-shaped body 40 and communicates, at an upper end, with a recirculation union 29 arranged at the front of the valve body 2 and designed to be connected to the compressor (FIG. 1), preferably through a timed solenoid valve, which is normally closed and is designed to open for an amount of time and at predetermined intervals (for example, 2 s every 5 minutes).

The valve body 20 finally defines, in an integral manner, respective tubular bodies 31, 32 of the minimum pressure valve 14 and of the anti-condensate valve 13.

More in particular, the body 31 of the minimum pressure valve 14 looks like a cylindrical appendage of the head 28 of the coalescence filter 17 and has a cavity 46 with horizontal axis C, perpendicular to the axes A and B and intersecting the latter. The cavity 46 (FIG. 8) comprises a first segment 47 having a greater diameter and a second segment 48 having an intermediate diameter and forming, together with the first segment 47, an abutment 49. An axial hole 50 establishes a communication between the second segment 48 and the outlet 30 of the coalescence filter 17.

The second segment 48 communicates with a delivery duct 37 (FIGS. 3 and 9) designed to be connected to the utility and radially coming out of the cavity 46 in a front direction.

FIGS. 8 and 9 show how the cavity 46 houses the movable equipment 52 of the minimum pressure valve 14. The movable equipment comprises a first hollow cylindrical slide 53, which is housed in the first segment 47 and is designed to cooperate, with a front sealing, with the abutment 49 due to the action of a first spring 54, whose elastic thrust can be adjusted through a screw 55.

A second hollow cylindrical slide 56 can slide inside the first slide 53, from which it projects with an end 57 of its; between the first slide 54 and the second slide 56 there is axially interposed a second spring 58. In non-deformed conditions of the second spring 58, the end 5 of the second slide 56 is in an intermediate area of the second segment 48 of the cavity 46.

Inside the second slide 56 there is mounted, in a sliding manner, a shutter 59, which is designed to isolate the second segment 48 from the hole 50 due to the thrust a third low-rigidity spring 60.

Figure 10:
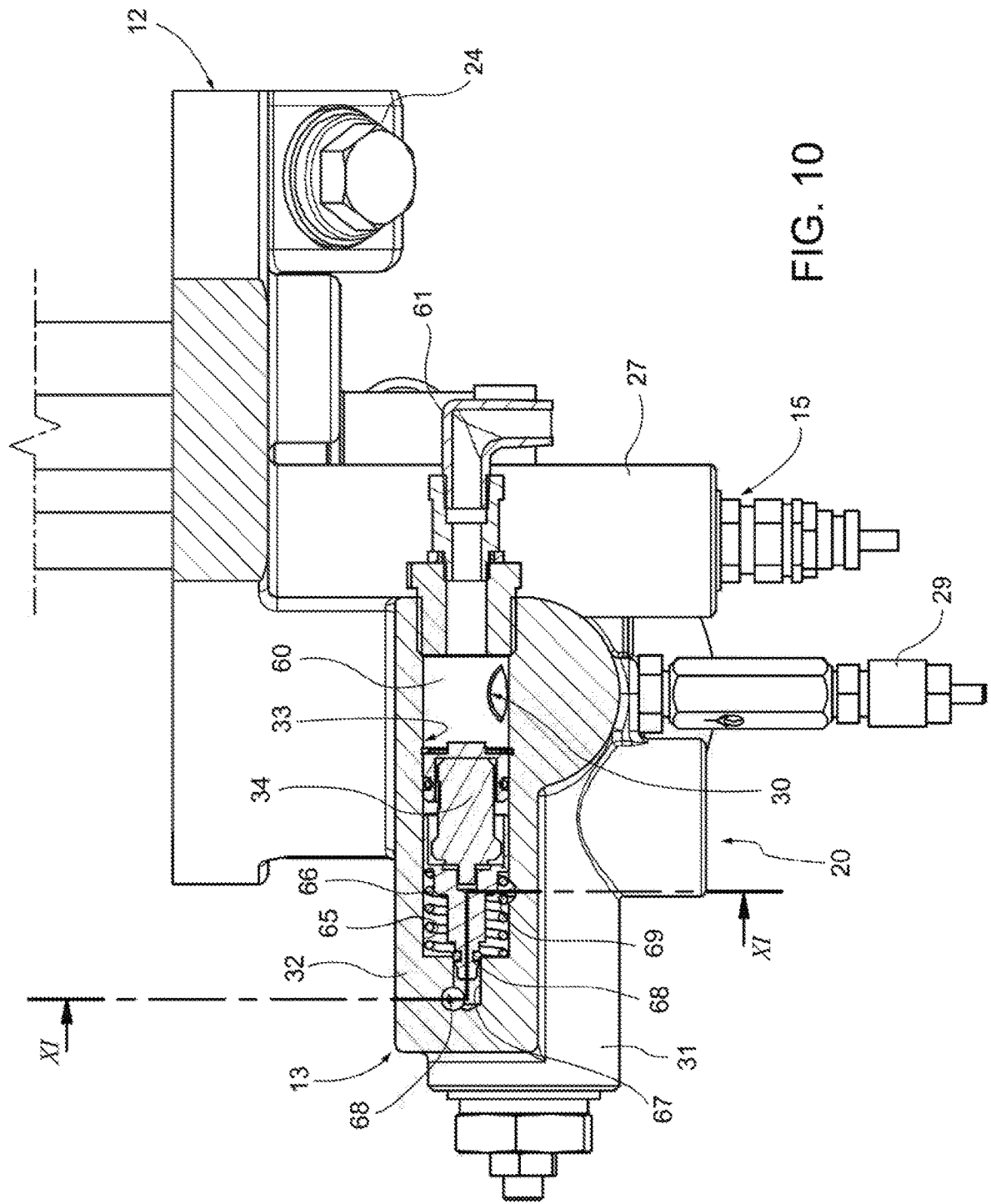

The body 32 of the anti-condensate valve 13 (FIG. 10) is a further cylindrical thickening of the valve body 20 defining a cavity 33 with axis D parallel to the axis C, which houses, in a sealing manner and in an intermediate position, a thermally sensitive bulb 34. The bulb 34 delimits a firs chamber 60 of the cavity 33, which communicates with the outlet 30 of the coalescence filter and with an union for the connection of the draining solenoid valve 16.

The thermally sensitive bulb 34 acts upon a slide 64, which is mounted so as to slide in a second chamber 65 of the cavity 33, against the action of a spring 66.

Figure 11:
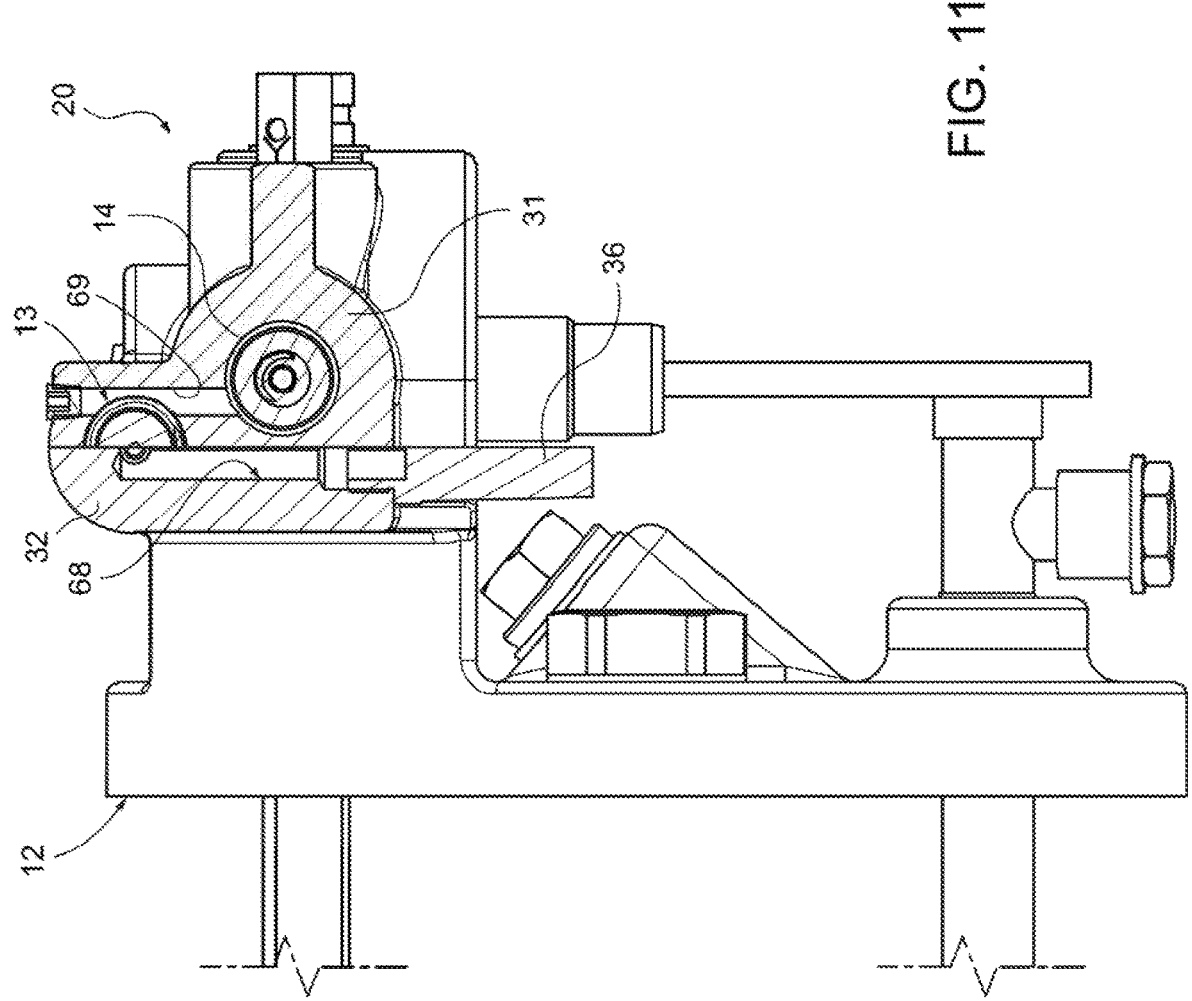
FIG. 11 is a cross section along line XI-XI of FIG. 10.

The second chamber 65 communicates, through an axial hole 67, with a vertical draining duct 68 (FIG. 11), which, at the bottom, leads out of the valve body 20, at whose outlet there is arranged a sintered filter 36. The second chamber 65 further communicates with the second segment 48 of the cavity 46 o the minimum pressure valve 14 through a vertical channel 69 (FIG. 11).

The slide 64 comprises an end portion 68, which is designed to engage, in a sealing manner, the axial hole 67.

The operation of the compressor assembly 1, which is already partly evident from the description above, is the following.

The compressed air generated by the compressor 4, containing suspended oil particles, is sent to the separator 6 through the duct 19.

A first oil separation takes place, through impact, inside the tank 11.

The compressed air then flows to the valve assembly 20 through the duct 27 and, unless a maximum safety pressure is reached, which determines the switching of the safety valve 15 to a position in which the compressed air is drained to the outside, to the coalescence filter 17.

Here the residual oil is separated and recirculated to the compressor 4 through the union 29, whereas the air, through the outlet duct 30, reaches the first chamber 60 of the cavity 33 of the anti-condensate valve 13 and the inlet hole 50 of the minimum pressure valve 14.

The lubrication of the compressor 4 takes place under the thrust of the pressure of the air in the tank 11 of the separator 6, thanks to which the oil is caused to recirculate from the separator 6 to the compressor 4 through the filter 7 and, if necessary, the heat exchanger 8.

When the compressor 4 is started, the shutter 59 of the minimum pressure valve 14 opens, but, until a predetermined minimum pressure (for example 5.5 bar) is reached, the second slide 56 remains in an air flow chocking position towards the utility. Therefore, in this step, the minimum pressure valve 14 determines a local pressure drop that is such as to allow the minimum pressure level in the separator 6 to be quickly reached, so as to ensure a correct lubrication of the compressor 4.

When the pressure in the separator 6 reaches the aforesaid minimum level, the resultant of the pressure forces acting upon the second slide 56 of the minimum pressure valve 14 overcomes the force of the spring 54 and the second slide 56 moves (to the left in FIGS. 8 and 9) and the flow rate delivered by the compressor 4 freely flows towards the utility.

When the pressure reaches a second threshold value (for example equal to 8-9 bar), which is defined by the calibration of the first spring 54 and is smaller than a maximum pressure of the utility (for example 10 bar, which, once reached, causes the compressor to stop working in a conventional manner due to a pressure switch), the first slide 53 opens (namely moves to the left in FIGS. 8 and 9), thus allowing the compressed air to reach the second chamber 65 of the anti-condensate valve 13.

Until reaching of a steady thermal condition detected by the thermally sensitive element 34, the anti-condensate valve 13 is open and drains part of the air to the outside through the draining duct 35 and the filter 36. Alternatively, the drained air flow rate can be directly recirculated to the compressor so to reduce the time needed by the system to reach the steady thermal condition.

Upon reaching of the steady thermal condition, the anti-condensate valve 13 closes and the compressed air is entirely sent to the utility through the outlet duct 37.

The object of the anti-condensate valve is that if draining part of the flow rate, thus delaying the moment in which the maximum pressure is reached, in order to make sure that the compressor 4 reaches the steady thermal condition before stopping working; by so doing, since the air, in the steady thermal condition, is above the dew point, no condensate forms.

An analysis of the features of the separator 6 clearly reveals the advantages of the invention.

The valve body 20, which is integrated in the lid 12, defines a series of auxiliary components and ducts integrated with one another; therefore, the sizes, the total weight and the number of components are reduced and, as a consequence, the assembling cycle is simplified.

Furthermore, always thanks to the integration of different auxiliary components and ducts in the lid 12 of the separator 6, most of the precision mechanical processing is carried out on one single component, which helps optimize the manufacturing cycle and obtain a reduction of manufacturing costs.

Finally, thanks to the modular structure of the compressor assembly, the installation thereof on board a vehicle is made easier, even in the presence of small available spaces.

The invention claimed is:

1. An oil separator (6) for separating oil from compressed air generated by a compressor, the separator comprising an oil tank (11) for compressor lubrication oil and a lid (12) for the tank, wherein the lid (12) integrally comprises a valve body (20) defining an outlet duct (27) of the tank (11), a head (28) of a coalescence filter (17) for separating oil from compressed air, a body of an anti-condensate valve (13), a body (31) of a minimum pressure valve (14) and the relative connection ducts, wherein the body (32) of the anti-condensate valve (13) defines a first chamber (60) housing a thermally sensitive element (34) of the anti-condensate valve and communicating with an air outlet duct (30) of the coalescence filter (17), and a second chamber (65) housing a shutter (66) operated by said thermally sensitive element and designed to interrupt the communication between an inlet duct (69) connecting the second chamber (65) to the minimum pressure valve (14) and a vent duct (68) when the temperature of the air in the first chamber reaches a predetermined threshold value.

2. A separator according to claim 1, characterized in that the outlet duct (27) of the tank (11) houses a maximum pressure valve (15).

3. A separator according to claim 1, characterized in that the valve body (20) defines a discharge duct (35) for discharging the compressed air from the anti-condensate valve (13) and a delivery duct (37) designed to be connected to a utility.

4. A separator according to claim 1, characterized in that said minimum pressure valve (14) defines a first pressure threshold value, which ensures the correct lubrication of the compressor (4); said minimum pressure valve defining a concentrated load loss between an outlet duct (30) of the coalescence filter (17) and a delivery duct (37) for pressure values lower than the first threshold value.

5. An oil separator (6) for separating oil from compressed air generated by a compressor, the separator comprising an oil tank (11) for compressor lubrication oil and a lid (12) for the tank, wherein the lid (12) integrally comprises a valve body (20) defining an outlet duct (27) of the tank (11), a head (28) of a coalescence filter (17) for separating oil from compressed air, a body of an anti-condensate valve (13), a body (31) of a minimum pressure valve (14) and the relative connection ducts, wherein said minimum pressure valve (14) defines a first pressure threshold value, which ensures the correct lubrication of the compressor (4); said minimum pressure valve defining a concentrated load loss between an outlet duct (30) of the coalescence filter (17) and a delivery duct (37) for pressure values lower than the first threshold value, and wherein said minimum pressure valve (14) defines a second pressure threshold value sufficient for supplying of the utility, said second value being greater than the first pressure threshold value but smaller than the maximum pressure defined by a pressure switch of the compressor (4), said minimum pressure valve (14) being designed to connect the outlet duct (30) of said coalescence filter (17) to said anti-condensate valve (13) for pressure values exceeding said second threshold value.

6. A separator according to claim 5, characterized in that it comprises a draining solenoid valve (16) supported by said lid (12).

7. A separator according to claim 5, characterized in that said lid (12) defines a first union (18) for the connection to the compressor (4) and a second union (23) for the connection to the oil filter (7).

8. A compressor assembly (1) comprising at least the following components:
an air filter (2) for the inlet air;
a compressor (4):
a separator (6) according to claim 5 for separating oil from the compressed air produced by the compressor (4);
an oil filter (7), which is interposed between the separator (6) and the compressor (4); and
a heat exchanger (8) for cooling down the oil before being introduced into the compressor.

9. A compressor assembly (1) according to claim 8, characterized in that said components are manufactured as distinct modules, which can be autonomously placed in the spaced available in the vehicle.

10. A separator according to claim 5, characterized in that the outlet duct (27) of the tank (11) houses a maximum pressure valve (15).

11. A separator according to claim 5, characterized in that the valve body (20) defines a discharge duct (35) for discharging the compressed air from the anti-condensate valve (13) and a delivery duct (37) designed to be connected to a utility.

* * * * *